(12) United States Patent
Riera

(10) Patent No.: US 7,445,694 B1
(45) Date of Patent: Nov. 4, 2008

(54) DEVICE FOR GENERATING MAGNETIC FIELDS FOR CATALYSING PHYSICO-CHEMICAL REACTIONS

(76) Inventor: Michel Riera, 71. Chemin des Parettes, F-06740 Châteauneuf de Grasse (FR)

( * ) Notice: Subject to any disclaimer, the term of this patent is extended or adjusted under 35 U.S.C. 154(b) by 0 days.

(21) Appl. No.: 09/242,191

(22) PCT Filed: Aug. 13, 1997

(86) PCT No.: PCT/FR97/01488

§ 371 (c)(1),
(2), (4) Date: May 17, 1999

(87) PCT Pub. No.: WO98/06491

PCT Pub. Date: Feb. 19, 1998

(30) Foreign Application Priority Data

Aug. 13, 1996 (FR) .................................. 96 10288

(51) Int. Cl.
*C07B 63/00* (2006.01)
(52) U.S. Cl. .................. 204/158.21; 204/158.2
(58) Field of Classification Search ................ 210/222, 210/695; 422/186.01; 204/555, 557, 158.2, 204/158.21
See application file for complete search history.

(56) References Cited

U.S. PATENT DOCUMENTS

| 438,579 | A | * | 10/1890 | Faunce et al. ................ 210/222 |
| 2,596,743 | A | * | 5/1952 | Vermeiren ................... 210/222 |
| 2,652,925 | A | | 9/1953 | Vermeiren ................... 210/1.5 |
| 2,939,830 | A | | 6/1960 | Green et al. ................. 204/248 |
| 3,473,108 | A | * | 10/1969 | McCormick ................. 324/306 |
| 3,551,794 | A | * | 12/1970 | Vander Heyden et al. ... 324/306 |
| 4,506,223 | A | * | 3/1985 | Bottomley et al. .......... 324/309 |

(Continued)

FOREIGN PATENT DOCUMENTS

EP 0 633 068 1/1995

(Continued)

OTHER PUBLICATIONS

Patent Abstracts of Japan, vol. 13, No. 105, Mar. 13, 1989 & JP 63 277778A(Anelva Corp.), Nov. 15, 1988.

*Primary Examiner*—Thao T. Tran
(74) *Attorney, Agent, or Firm*—Drinker Biddle & Reath LLP

(57) ABSTRACT

A device for generating a magnetic field moving in at least one field plane located in a fluid to be treated and in which the gradient of the vector product between the intensity of the magnetic field and its displacement velocity induces stereochemical deformations of the molecules of the treated fluid, which may be a limestone water or a fuel. Each field plane may have a first magnetic field generator such as a pair of coils (10, 10') and a second magnetic field generator such as a pair of coils (12, 12') forming an angle θ with the first generator, both being disposed at the periphery of the pipe (20) through which the fluid to be treated is flowing. At least one of the two field generators generates a magnetic field whose amplitude is variable over time so that the resultant is a magnetic field moving in the field plane having a variable amplitude and a direction moving at an angular velocity such as to obtain the highest possible gradient of the vector product.

8 Claims, 4 Drawing Sheets

U.S. PATENT DOCUMENTS

Figure 4A:
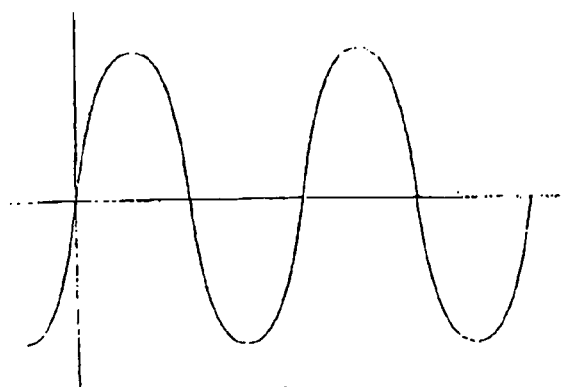

| | | | |
|---|---|---|---|
| 4,701,707 A * | 10/1987 | Riedl | 324/309 |
| 4,865,747 A * | 9/1989 | Larson et al. | 210/222 |
| 5,161,512 A | 11/1992 | Adam et al. | 123/538 |
| 5,738,766 A * | 4/1998 | Jefferson | 210/222 |
| 5,837,143 A | 11/1998 | Mercier | 210/222 |
| 6,489,872 B1 * | 12/2002 | Fukushima et al. | 335/299 |

FOREIGN PATENT DOCUMENTS

| | | |
|---|---|---|
| GB | 2088239 | 6/1982 |
| GB | 2250221 | 6/1992 |
| JP | 63-277778 | * 11/1988 |
| WO | WO 93/08127 | 4/1993 |
| WO | WO 98/08127 | 4/1993 |
| WO | WO 96/10692 | 4/1996 |

* cited by examiner

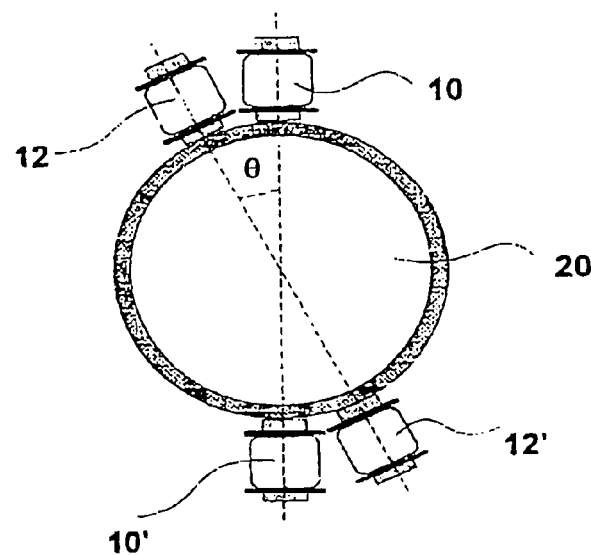
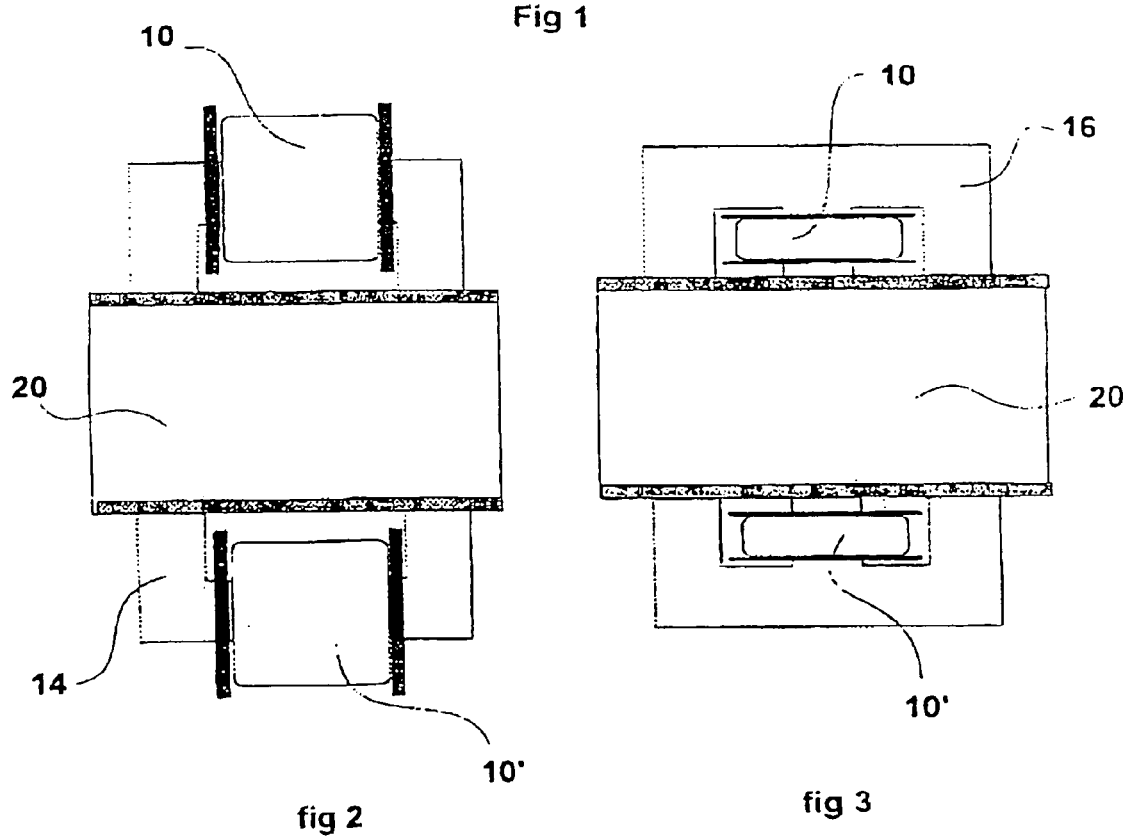
Fig 1
fig 2
fig 3

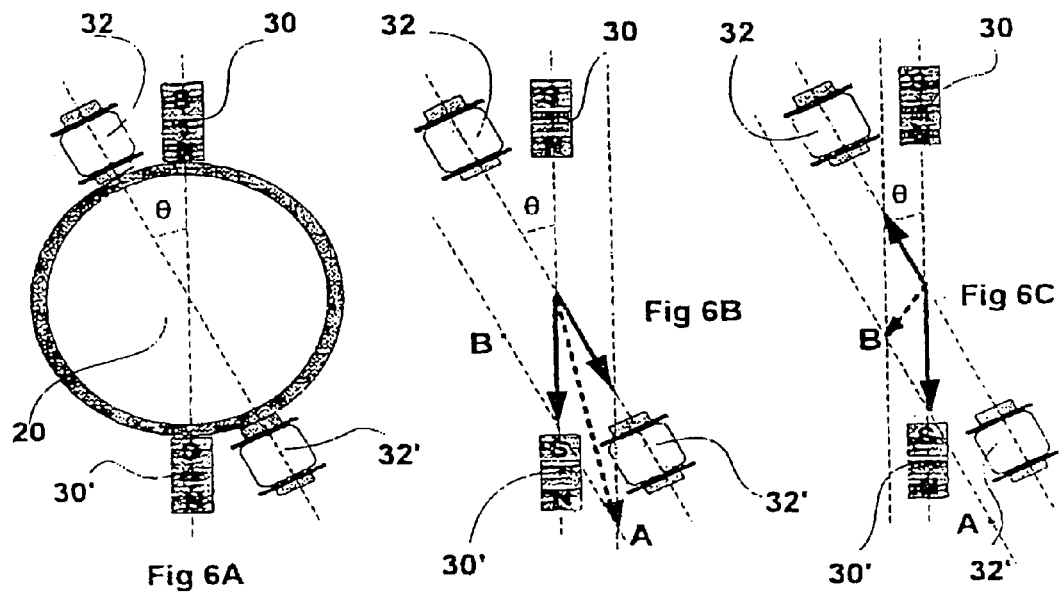
Fig 6A  Fig 6B  Fig 6C
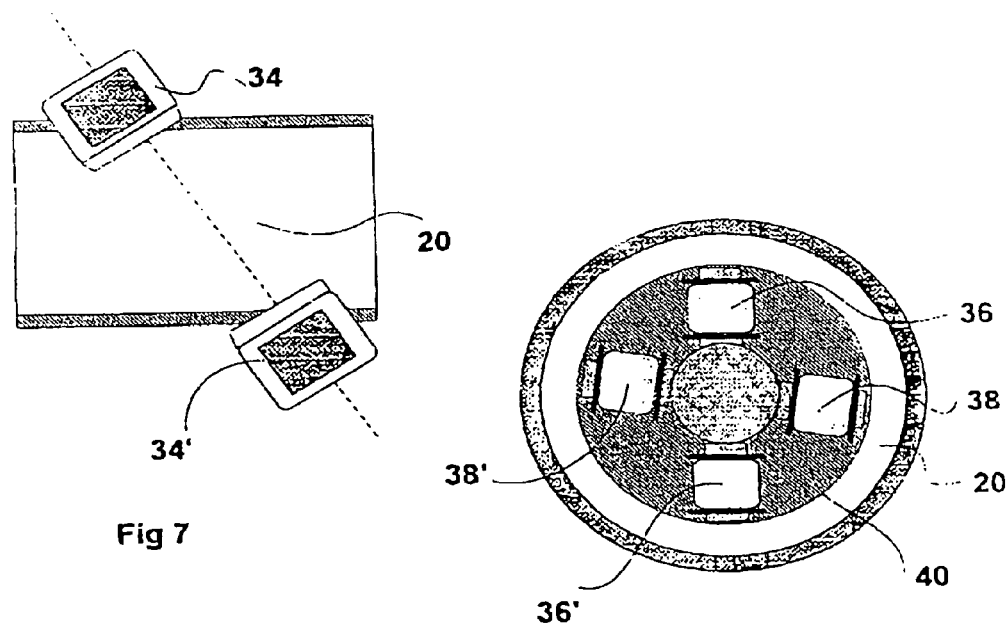
Fig 7
Fig 8

DEVICE FOR GENERATING MAGNETIC FIELDS FOR CATALYSING PHYSICO-CHEMICAL REACTIONS

The present invention relates to the catalysis of chemical or physical-chemical reactions by moving magnetic fields within substances to be treated and in particular a device for creating a moving magnetic field with a view to creating stereochemical deformations of the molecules in a given medium.

It is known that during the last world war, permanent magnets were used on fuel delivery pipes of aircraft engines as a means of reducing the fumes created, thereby making detection in the sky more difficult.

Since then, numerous patents have been filed on the subject of using magnetic fields to enhance fuel combustion, the general features of which have related to static or omnidirectional and alternating magnetic fields.

Documents GB 2.250.221, WO 93/08127 or WO 96/10692 in particular describe the use of fixed magnetic fields, optionally superposed on alternating fields, with a view to producing a magnetic field perpendicular to or parallel with the flow direction of a fluid as a means or inducing stereochemical reactions.

However, the results clearly show that if the fields are perpendicular to the axis of the fluid pipe, the increase in combustion performance depends on the speed at which the fuel passes across the magnetic field and the intensity of this magnetic field.

This observation is clearly reminiscent of Laplace's law on electromagnetism and P. Langevin's theory relating to the effect of magnetic fields on any type of material, whether it be insulating or conductive.

If applied to the peripheral electrons of molecules or organized molecular complexes, P. Langevin's theory, which explains the general phenomena of diamagnetism, based on Laplace's law: $F=o*V^{\wedge}H$, allows us to consider the question of whether the relative velocity V is not only that of the displacement of a valence electron in its own orbital but also that of the relative displacement of the magnetic field with respect to the fluid, in which case it causes a movement of the electron to a different orbital and leads to a stereochemical deformation of the molecule or molecular complex, which may have a considerable lifetime.

These stereochemical deformations of the molecules are known to be the mechanism whereby physical catalysts which adsorb reactants act, such as platinum foams, finely divided Raney nickel, etc. Such physical catalysts have tended to become less commonly used, but have been replaced by chemical catalysts which often act by means of a comparable mechanism.

To get a clear idea of the concepts involved, it is useful to look at the example of a fuel. This is an octane or at least an alkane with a longer or shorter chain. From 4 carbon atoms, i.e. butane (in this case a gas), there are several possible stereochemical arrangements of the molecule. In its lowest energy state, i.e. its normal state, the alkane molecule has a compact shape with the minimum of reactive sites. If the valence electrons of the molecule are excited by a magnetic field moving rapidly relative to the fuel, they move to higher energy levels, i.e. higher orbitals in accordance with Schrödinger's theory, causing stereochemical deformation of the molecule. The molecule changes to a higher energy state with a linearly extended form, thereby offering the maximum of reactive sites; the activation energy for reactions of the molecule is therefore reduced accordingly.

It has also been known for a long time that static or omnidirectional and alternating magnetic fields superposed co-linearly promote crystalline seeding within saline solutions passing through them.

The mechanisms which cause this are assumed to be those of agitation of the ions, this being generated by the Laplace forces which induce a number of shocks and promote seeding.

Accordingly, patent BE 461.600 describes a device which generates a rotating magnetic field designed to create Foucault currents as a means of preventing deposits of incrustation on the walls of ducts or other pipelines through which water to be processed flows.

Designed as the stator of an asynchronous electric motor, the rotating magnetic field is produced at a constant intensity and rotates at the frequency of the polyphase current used. It should also be pointed out that the characteristics of the water causing incrustation may vary to a large degree and the device must be capable of generating a wide range of Foucault currents in order to cover the range required by the nature of the water to be treated. This variation is obtained by increasing the thickness of the water streams subjected to the magnetic field or by varying the characteristics of the Foucault current generator along the path. The variations which can be applied are therefore specific to the initial mechanical characteristics of the device and can not be adapted to suit a particular situation.

It has been shown that the effect of a magnetic field on a salt solution such as water containing calcium salts is comparable to the effect of a magnetic field on a hydrocarbon. In fact, it is known that an ion does not exist in isolated form in its solvent but is surrounded by a complex of solvent molecules. The make-up of this complex, ion plus solvent molecules, is a result of the solvation energy and this complex is stable, at an energy minimum, which allows the salt to remain dissolved. It is also known that the internal roughness of the walls of fluid-carrying pipes has sufficient energy to adsorb the solvation complexes, modify their stereochemical arrangements and initiate crystallization. This latter phenomenon explains the build-up of scale in pipes, particularly if they are heated. The action of a magnetic field moving relative to the water in addition to the simple Laplace force on the main electric charge which the ion represents, and which therefore naturally generates a Foucault current, builds up forces on the valence electrons of this solvation complex and, as with any molecule or molecular or ionic complex in accordance with P. Langevin's theories, enables the energy of these electrons to be increased. The movement of the valence electrons to a higher orbital modifies the stereochemical arrangement of the complex and, by the same action, alters the salvation energy, and thereby reduces the seeding energy for the crystals, enabling them to be generated spontaneously and in large numbers within the actual fluid. Once created, these seed crystals grow within the fluid but no longer stick to the walls.

In effect, in both of the applications described above, the results obtained have never been altogether conclusive, nor have they lived up to what one might have expected from the use of magnetic fields. This is explained by the fact that it is very difficult to ascertain how much energy is needed to produce the desired deformation of the molecules due to the fact that it is dependent on how much energy the electrons absorb in order to move from one electronic orbital into another based on quantum theory. Until now, no attempt has been made to put this latter application into practice in order to generate magnetic fields as a means of inducing stereochemical deformation.

Accordingly, the main objective of the invention is to provide a device for generating a moving magnetic field used in a fluid medium in order to induce therein stereochemical deformation of the molecules without ascertaining the levels of energy required to obtain the optimum result.

The solution to this problem provided by the invention consists in subjecting the molecules or molecular or ionic complexes to a wide range of magnetic energy within which range the molecule or complex will be able to absorb exactly the energy it requires in the same way as a coloured body absorbs within the light spectrum only those radiations corresponding to permitted transitions.

In order to achieve this result, the overriding idea is that the gradient of the vector product, according to Laplace's law, of the magnetic field H by the relative velocity V of the field in relation to the fluid should have the highest value possible, the only way of producing this being to apply a moving magnetic field of variable amplitude and variable angular velocity. It should be pointed out that the relative velocity V is primarily the displacement velocity of the magnetic field given that this velocity is much larger than the velocity at which the fluid circulates and that the fluid does not necessarily have to be moving.

Accordingly, the objective of the invention is to provide a device for generating a magnetic field moving in at least one magnetic field plane located in the medium to be treated and for which the vector product of the intensity of the magnetic field by its displacement velocity induces stereochemical deformations of the molecules of the medium. In each magnetic field plane, there are at least two means for generating a first and a second magnetic field, the directions of the magnetic fields subtending a predefined angle Θ and at least one of these magnetic fields being of a variable amplitude over time so that the resultant of the two magnetic fields is a magnetic field moving in the plane of the field which has a variable amplitude over time and in a direction moving at a variable angular velocity such that the gradient of the vector product is of the highest possible value.

Figure 4B:
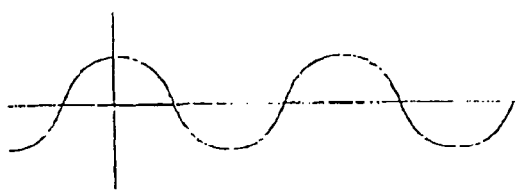
Figure 4C:
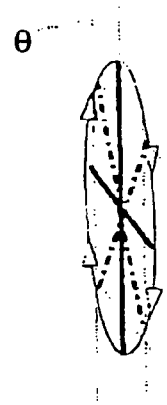
Figure 5A:
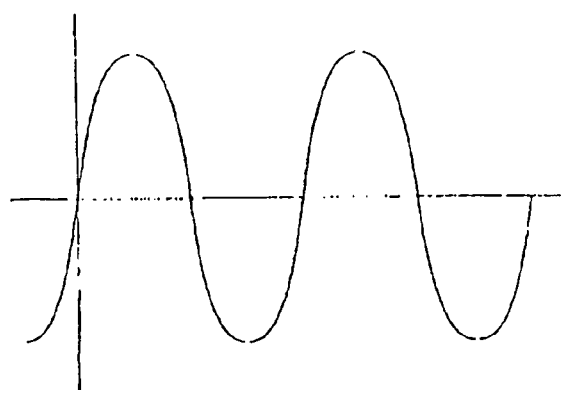
Figure 5B:
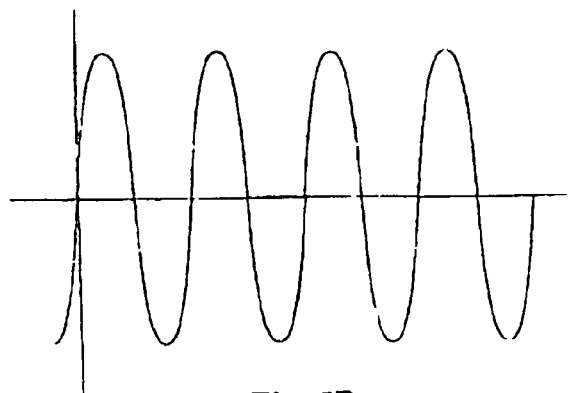
Figure 5C:
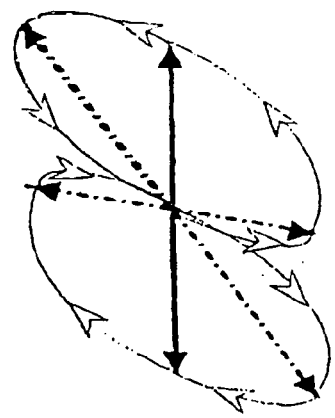
Figure 9:
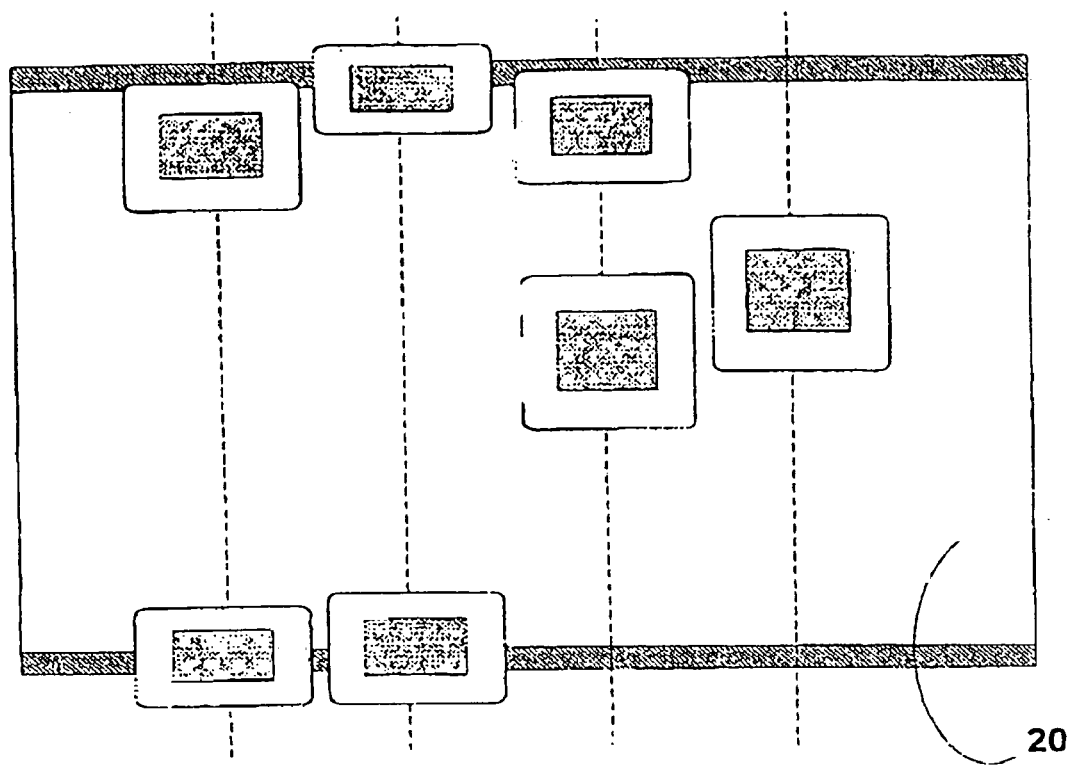
Figure 10:
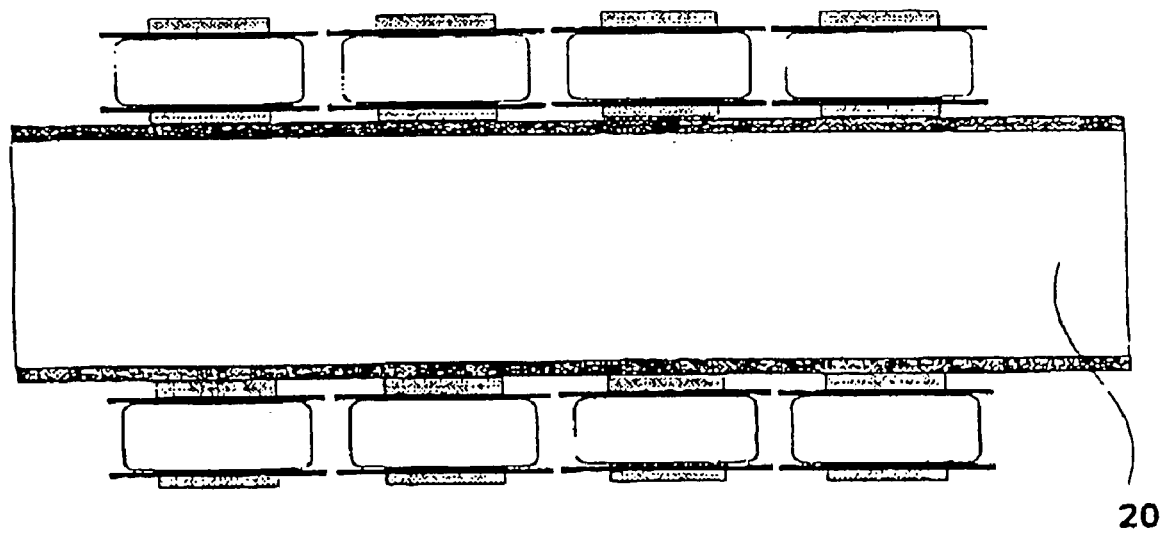

The objectives, aims and features of the present invention will become clearer from the description below, given with reference to the drawings, in which:

FIG. 1 illustrates a view in section of a generating device of a first embodiment of the device as proposed by the invention, applied to a pipeline through which the fluid to be treated is flowing, FIG. 2 depicts a view in section of a device of the type illustrated in FIG. 1, in which the magnetic field of a pair of coils is closed by a U-shaped armature, FIG. 3 shows a view in section of a device of the type illustrated in FIG. 1, in which the magnetic field of a pair of coils is closed by an E-shaped armature, FIGS. 4A, 4B, 4C depict respectively the sinusoidal amplitude of the first magnetic field used in a specific example of a first embodiment of the device proposed by the invention, the sinusoidal amplitude of the second magnetic field and the curve described by the end of the vector of the resultant magnetic field, FIGS. 5A, 5B, 5C depict respectively the sinusoidal amplitude of the first magnetic field used in another specific example of the first embodiment of the device, the sinusoidal amplitude of the second magnetic field and the curve described by the end of the vector of the resultant magnetic field, FIGS. 6A, 6B, 6C depict respectively a view in section of a second embodiment of the generating device, applied to a pipeline through which the fluid to be treated is flowing, and the two extreme positions of the vector representing the resultant magnetic field, FIG. 7 illustrates a third embodiment of the device proposed by the invention in which the magnetic field is not perpendicular to the direction in which the fluid to be treated is moving, FIG. 8 represents a fourth embodiment in which the device of the invention is incorporated in the passage through which the fluid to be treated is circulating, FIG. 9 is a view in section of a variant of the first embodiment of the invention having several magnetic field planes, and FIG. 10 is a view in section of a specific example of the embodiment illustrated in FIG. 9.

As illustrated in FIG. 1, in a first embodiment of the invention two pairs of coils 10, 10' and 12, 12' (it should be noted that each pair of coils could be replaced by a single coil) are arranged in a matching layout and forming an angle of E degrees, this angle being adjustable and being variable between a minimum value obtained when the coils are in contact (as in the drawing) and a maximum value of 180° less the minimum angle imposed by the dimensions of the coils. The coils are made up of n turns of electric wire, n being variable from several turns in the case of high frequencies or high current intensities up to several thousand turns in the case of low intensities or low frequencies and conventionally having a core of a ferromagnetic substance, possibly made up of sheets of iron for low frequencies, and more generally of mild ferrites accepting very high frequencies. This core may be in the shape of a simple bar but it is possible to use shapes which would enable the magnetic fields to be closed such as the core 14 of FIG. 2 which is U-shaped or the core 16 of FIG. 3 which is E-shaped.

In this embodiment, the pairs of coils are arranged at the periphery of the pipe 20 through which the fluid to be treated is circulating.

It should be pointed out that the magnetic fields applied by the coils of FIG. 1 are in a single field plane whereas the magnetic fields generated by the coils in FIG. 2 are located in two parallel field planes due to the U-shape whilst those of FIG. 3 are located in three parallel fields due to the E-shape.

In the device illustrated in FIG. 1, each pair of coils is supplied by a current having its own pattern of amplitude which may be any pattern, and its own frequency without one pair of coils necessarily being in any relation to the other. The resultant field is then of a totally variable amplitude which may possibly and periodically be the vector sum of the maximum amplitudes of the separately produced fields, which can represent quite considerable amplitude variations of the fields, variable in direction depending on the angular velocities which are also variable and which may assume high values depending on the frequencies used. The spectrum of energies represented by H^V as a function of time is therefore very wide and amply covers the bands of energy required to change the molecules from a stable, low energy state into an excited, higher energy state which will be of an acceptable lifetime.

One embodiment using the device schematically illustrated in FIG. 1 uses pairs of coils generating magnetic fields whose amplitude is sinusoidal as a function of time. Accordingly, sinusoidal currents may be applied to the pairs of coils, having different amplitudes and the same frequency but phase-shifted by any angle. FIGS. 4A and 4B provide graphs of the magnetic fields generated by the coils at a phase-shift of 90°. FIG. 4C illustrates the curve described by the end of the resultant magnetic vector and that of its angular sweep velocity, the drawing being given for time intervals of one eighth of the period, and clearly illustrates the fact that the gradient is steeper as the difference in amplitudes is greater.

Sinusoidal currents of the same amplitude but which have different frequencies from one another, for example one frequency double the other, may also be applied to the two pairs of coils. The graphs of the magnetic fields generated by such coils at double frequency are illustrated in FIGS. 5A and 5B. FIG. 5C shows the curve described by the end of the resultant magnetic vector and that of its angular sweep velocity, the drawing being based on a unit of one eighth of the lowest frequency. It clearly illustrates the fact that the gradient is steeper as the difference between the frequencies is greater.

In the case of the two examples above, we have highlighted the importance of the differences in amplitude and frequency of the fields combining to produce the variable moving field.

To keep matters simple, we have not illustrated variations in the resultant fields other than those produced by phase-shifts of 90° or variations in the resultant fields produced by the values which may be assumed by the angle Θ between the two directions of the component fields. The person skilled in the art will know how to continue this demonstration.

A second embodiment of the device proposed by the invention is illustrated in FIGS. 6A, 6B, 6C. In these instances, the device has a pair of permanent magnets 30 and 30' (a single permanent magnet could also be used), diametrically opposed so that their fields are combined (the North pole of one faces the South pole of the other) and a pair of matching coils 32 and 32', i.e. diametrically opposed and wound so that their fields combine, placed at E degrees from the magnets as illustrated in the drawing. When current complying with any intensity pattern (this may of course be sinusoidal but it may also be saw-tooth or any other pattern which is repetitive or not) is applied to the coils the vector sum of the magnetic field created by the permanent magnets and the field of fixed direction but variable amplitude generated by the coils gives a resultant field whose amplitude, direction and algebraic velocity are variable. This resultant field may be described as oscillating and exhibits all the characteristics of the invention. FIG. 6B illustrates the position of the resultant field when the variable field is maximum in one direction and FIG. 6C when the field is maximum in the opposite direction. During our endeavours to obtain a wide variation in the spectrum V^H, it was particularly interesting that the direction in which the resultant field is displaced changes; this is particularly so in this instance with these fields which can be described as oscillating.

Between these two extremes, illustrated in FIGS. 6B and 6C, the resultant field vector is displaced at a variable angular velocity and at an amplitude which is also variable, complying with the pattern of the current applied to the coils. It may be noted that the end of the vector representing the resultant magnetic field is located on a line segment whose two ends A and B are reached at the two maxima of the variable field. It is interesting to note that if the cores of the coils are U-shaped or E-shaped, and the permanent magnet has a length equal to the spacing of the poles of the U or E, these poles emitting fields of opposite directions, the movements of the fields combined with the static field of the permanent magnet are naturally of opposite directions, which increases the values of the spectrum of H^V sought.

The device is of a simple construction and requires nothing more than a current generator of variable frequency in order to place the spectrum of the values V^H in the desired range to produce the required reaction.

The field plane is not necessarily perpendicular to the axis of the fluid flow through the passage 20 but may be inclined at a certain angle, as are the coils 34 and 34' of the third embodiment of the device illustrated in FIG. 7. This, inclination may be of any value since within the product V^H, the velocity considered is not that of the fluid movement but solely that of the relative displacement of the field and the angle between V and H is therefore always 90° although if the angle of inclination were greater, it would tend to move the coils farther apart and consequently reduce the intensity of the field produced. It is therefore reasonable not to exceed 45° for this angle of inclination relative to the axis of the fluid pipe.

In a fourth embodiment of the device proposed by the invention, the pairs of coils 36, 36' and 38, 38' or polar elements are inside the pipe 20. In this case, the polar elements are coated with an electrically insulating resin 40 which is not ferromagnetic. This is also almost the equivalent of an asynchronous motor with a central stator, again with the same difference that the angle subtended by the axes of the coils, pairs of coils or permanent magnets is not fixed but must be chosen to obtain the desired result. If encased in an insulating resin, it can not, unfortunately, be adjusted subsequently.

So far, all the polar elements (permanent magnets or coils) have been shown as being in a common field plane. However, since the polar elements have a natural width which is not limited in theory but is so by practical conditions, hence ranging from several millimeters up to as much as several centimeters and more in the case of large devices, it is possible to think in terms of a given section of width within which the effects of the moving fields will occur. It is therefore perfectly conceivable, as illustrated in FIG. 9 and FIG. 10 (FIG. 10 is a view in section of a specific example of FIG. 9 in which all the coils are aligned along one generatrix in the passage) to join any number of sections of moving fields. The sections may possibly have the same spectrum characteristics as regards values H^V, with the sole aim of increasing the field of action and the total power of the device, or may also be totally different.

In all the embodiments of the device proposed by the invention described above, the use of magnetic fields whose amplitude and displacement velocity are variable is a simple method and offers a large degree of flexibility since the intensity of the magnetic field, its range of variation and its displacement velocity are values which are entirely controllable, being readily adaptable to the type of chemical or physical-chemical reaction required, and act on the very core of the substances, regardless of their nature, be they gas, liquids irrespective of viscosity or powdered solids, and not only on the adsorption surfaces. Efficiency is therefore particularly enhanced and is totally independent of the velocity at which the fluid is moving, it also being possible for the fluid to be static.

By adapting the parameters (intensity, frequency, amplitude, angular velocity), it is possible to cover larger or smaller spectra of values V^H which can be adapted to suit the type of chemical or physical-chemical reaction required.

The first embodiment of the device proposed by the invention (illustrated in FIG. 1) is mainly used in applications involving the magnetic treatment of water likely to give rise to incrustation. The anti-scale effect is totally independent of the velocity at which the water is moving in the magnetic field since it is the field which varies as regards amplitude, displacement velocity and direction of movement. The system can be adjusted, even after it has been set up and not just during manufacture as with the situation described in document BE 461.600, and covers a very broad range of values of H^V.

The coils or pairs of coils are placed in a common plane around the main water delivery pipe, which means that no plumbing work is required if the pipe is of a non-ferromagnetic substance (usually copper or PVC). The angle formed by the pairs of coils can be adjusted, which facilitates installation, water pipes generally being close to walls. Current is applied to the coils or pairs of coils by independent current generators, each being separately adjustable with respect to frequency in order to adjust the spectrum of values $V\hat{}H$ to take account of the latitude for adjusting the angle formed by the pairs of coils. Consequently, the device can be readily adjusted to suit the characteristics of the water pipe and the nature of the water, which contains nothing more than calcium carbonate in solution. The range of spectra which is possible in terms of values $H\hat{}V$ means that solvation complexes other than that mentioned above can be treated.

The second embodiment illustrated in FIG. 6A mainly finds applications in injection or carburetor heat engines with enhanced fuel delivery. The device significantly increases the energy efficiency of the fuel and reduces pollution. In the case of injection engines, one or more devices may be placed on the pipes delivering fuel to the injectors and quite close to them. A simple monophase current generator with a signal of any shape, being adjustable in frequency between several hertz and several thousand hertz, powered by the battery when contact is made, is sufficient.

The size of the magnets and coils is adjusted to match the section of the fuel delivery pipes.

In the case of carburetor engines, the devices are mounted on the intake pipes for the mixture. Since these pipes are of a larger diameter, the dimensions of the device are adjusted accordingly.

Generally speaking, the device proposed by the invention can be used for any type of fluid where a specific type of behaviour can be improved, since the action of the device is totally independent of the natural movements of the fluids, and the fluids do not have to be flowing through a passage and can be static in a container. By way of example, although this is not restrictive, the solubility of essential oils in water can be improved by the action of the device proposed by the invention.

The invention claimed is:

1. A method for preventing the deposit of incrustations of water or improving the combustion efficiency of a fuel for a heat engine by a moving magnetic field, comprising the steps of:
    causing said water or fuel to flow in a pipe;
    providing a first coil or pair of coils and applying a first current as a function of time to said first coil or pair of coils to generate a first magnetic field through said water or fuel;
    providing a second coil or a pair of coils and applying a second current to said second coil or pair of coils to generate a second magnetic field through said water or fuel;
    wherein at least one of said magnetic fields is generated by a said coil or pair of coils having a ferromagnetic core to close the magnetic fields generated by said coil or pair of coils
    wherein said first and second magnetic fields intersect so as to define a magnetic field plane, the directions of said first and second magnetic fields subtending between them a predefined angle within the magnetic field plane, the said magnetic field plane not being parallel to the axis of the pipe; and
    varying the amplitude of said first and second magnetic fields over time in such a manner that the resultant of said first and second magnetic fields is a magnetic field moving in said field plane having an amplitude which is variable over time and a direction moving at a variable angular velocity.

2. A method according to claim 1, wherein said currents are currents of the same frequency but of different amplitudes, and shifted in phase by 90°.

3. A method according to claim 1, wherein said currents are currents of the same amplitude but of different frequencies.

4. A method according to claim 1, in which magnetic field plane forms an angle of between 45° and 90° with the direction of flow of said water or fuel to be treated.

5. A method according to claim 1, comprising:
    generating a plurality of first magnetic fields through said water or fuel; and
    generating a respective plurality of second magnetic fields through said water or fuel;
    wherein each said first magnetic field and respective second magnetic field intersect so as to define a respective magnetic field plane, the magnetic field planes being parallel.

6. A method according to claim 5, comprising the step of generating at least one of said pluralities of magnetic fields by a said coil or pair of coils having a ferromagnetic core, said core being U-shaped, in which case the magnetic field generated occurs in two parallel magnetic field planes, or E-shaped in which case the magnetic field generated occurs in three parallel magnetic field planes.

7. A method according to claim 1, in which said water is a limestone water, and the application of the magnetic field generated preventing the deposit of limestone incrustations.

8. A method according to claim 1, in which said given medium is a fuel for a heat engine, the application of the magnetic field generated enabling said fuel to enhance and improve combustion efficiency.

* * * * *